(12) United States Patent
Kolatschek et al.

(10) Patent No.: US 9,469,183 B2
(45) Date of Patent: Oct. 18, 2016

(54) MASS-COUPLING ARRANGEMENT FOR A VEHICLE

(71) Applicant: Robert Bosch GmbH, Stuttgart (DE)

(72) Inventors: Josef Kolatschek, Weil der Stadt (DE); Gian Antonio D'Addetta, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/388,844

(22) PCT Filed: Feb. 11, 2013

(86) PCT No.: PCT/EP2013/052661
§ 371 (c)(1),
(2) Date: Sep. 29, 2014

(87) PCT Pub. No.: WO2013/143747
PCT Pub. Date: Oct. 3, 2013

(65) Prior Publication Data
US 2015/0053492 A1 Feb. 26, 2015

(30) Foreign Application Priority Data
Mar. 27, 2012 (DE) ........................ 10 2012 204 856

(51) Int. Cl.
*B62D 21/15* (2006.01)
*B60K 1/04* (2006.01)
*B60L 11/18* (2006.01)

(52) U.S. Cl.
CPC .................. *B60K 1/04* (2013.01); *B60L 11/18* (2013.01); *B60K 2001/0455* (2013.01); *B60K 2001/0494* (2013.01); *B60Y 2306/01* (2013.01)

(58) Field of Classification Search
CPC .......... B62D 21/25; B60K 1/04; B60L 11/18
USPC ................................ 180/68.5, 274, 232, 282
See application file for complete search history.

(56) References Cited

U.S. PATENT DOCUMENTS 2,959,446 A * 11/1960 Thompson .................. 296/68.1
5,249,826 A 10/1993 Bell
(Continued)

FOREIGN PATENT DOCUMENTS

DE 102007062599 6/2009
DE 102009053138 9/2010
(Continued)

OTHER PUBLICATIONS

International Search Report for Application No. PCT/EP2013/052661 dated May 14, 2014 (English Translation, 3 pages).

*Primary Examiner* — Hau Phan
(74) *Attorney, Agent, or Firm* — Michael Best & Friedrich LLP

(57) ABSTRACT

The invention relates to a battery support arrangement (12) for a vehicle (10), with a battery-holding element (14) for receiving a battery (16), a guide arrangement (18) by means of which the battery-holding element (14) is mounted movably relative to the vehicle (10), and with coupling elements which are designed to couple the earth-receiving element (14) to a vehicle structure connected fixedly to the vehicle (10) and/or at least partially to decouple the battery-holding element from the vehicle structure, wherein the coupling elements have an actuator (22) which is designed to adjust the degree of the coupling and/or the temporal profile of the coupling.

22 Claims, 2 Drawing Sheets

(56) References Cited

U.S. PATENT DOCUMENTS

| | | | | |
|---|---|---|---|---|
| 5,518,271 | A * | 5/1996 | Bell | 280/806 |
| 5,555,950 | A | 9/1996 | Harada et al. | |
| 6,059,354 | A | 5/2000 | Rajasingham | |
| 6,158,538 | A | 12/2000 | Botzelmann et al. | |
| 7,070,015 | B2 * | 7/2006 | Mathews et al. | 180/68.5 |
| 7,499,781 | B2 * | 3/2009 | Hermann | 701/45 |
| 7,614,469 | B2 * | 11/2009 | Kumar et al. | 180/68.5 |
| 7,641,013 | B2 * | 1/2010 | Kim et al. | 180/68.5 |
| 8,276,698 | B2 * | 10/2012 | Guss et al. | 180/68.5 |
| 8,356,687 | B2 * | 1/2013 | Baumann et al. | 180/274 |
| 8,540,282 | B2 * | 9/2013 | Yoda et al. | 180/68.5 |

FOREIGN PATENT DOCUMENTS

| | | |
|---|---|---|
| DE | 102010006514 | 9/2010 |
| DE | 102010033123 | 2/2012 |
| EP | 1099607 | 5/2001 |
| FR | 2694240 | 2/1994 |
| FR | 2964913 | 3/2012 |
| GB | 403087 | 12/1933 |
| GB | 1476927 | 6/1977 |
| JP | H1016689 A | 1/1998 |
| JP | 2008230519 | 10/2008 |
| WO | 2005054042 | 6/2005 |

* cited by examiner

MASS-COUPLING ARRANGEMENT FOR A VEHICLE

BACKGROUND OF THE INVENTION

The present invention relates to a mass-coupling arrangement for a vehicle.

It is generally known from the prior art to drive vehicles solely by means of an electric motor (electric vehicle) or by means of a combination of an electric motor and a drive machine of another kind (hybrid drive). In these cases, the electrical energy which is necessary to drive the electric motor is stored in an electrical energy store, such as a battery or a rechargeable battery for example. The battery can be charged from time to time by means of an external electrical energy source and can be used to store recovered brake energy (regenerative energy).

Known structural designs of electrically driven vehicles provide for an overproportionally large mass fraction of the battery in comparison to the vehicle as a whole. In order to achieve a long range, the electrically driven vehicles are equipped with large batteries which can have a mass of several 100 kg (for example 100 to 400 kg). Therefore, the battery forms up to 30% of the total mass of the vehicle. Owing to the high mass, the battery constitutes a potential danger in the event of an accident. Therefore, fastening the battery to the body of the motor vehicle plays an important role. Known concepts for electrically driven vehicles provide the battery as a uniform rigid block in the region of the underbody of the vehicle (ideally between the front axle and rear axle). The battery consequently makes a contribution to lowering the overall center of gravity of the vehicle. In addition, the battery can be well protected by the surrounding supporting structure or can contribute to protection of the passenger compartment as the supporting structure itself.

A higher total mass of the vehicle can further have positive and also negative effects on the occupants of the vehicle in the event of a vehicle/vehicle collision or else in the event of a collision with an inflexible object, such as a barrier or a pole. In the event of a vehicle/vehicle collision, the occupants in the vehicle of lower weight will, from a theoretical point-of-view, be subject to greater acceleration (impact momentum) than those in the heavier vehicle. The mass which is active at a certain time and its energetic proportion in the overall momentum balance is important for the impact momentum.

SUMMARY OF THE INVENTION

The present invention therefore provides a mass-coupling arrangement for a vehicle, wherein the mass-coupling arrangement has a mass-holding element for holding an object of mass, a guide arrangement by means of which the mass-holding element is mounted such that it can move relative to the vehicle, and coupling means which are designed to couple the mass-holding element to a vehicle structure which is fixedly connected to the vehicle, and/or to at least partially uncouple said mass-holding element from the vehicle structure, wherein the coupling means have an actuator which is designed to adjust the degree of coupling and/or the time profile of the coupling.

Owing to the actuator-based coupling and uncoupling of the mass-holding element of the vehicle, the effect on the occupants is reduced in the event of a vehicle collision since only a reduced proportion of the total vehicle mass, rather than the entire vehicle mass, acts at a specific time. In this case, the object of mass (for example a traction battery of an electrically driven vehicle) is shifted from a state in which it is coupled to the vehicle structure (for example a body of the vehicle) to a state in which it is (at least partially) uncoupled from the vehicle structure, and back again, during a collision of the vehicle. Therefore, the impact momentum can be influenced in an advantageous manner. The effect acting on the vehicle occupants is reduced.

In a preferred embodiment, the coupling means have a fastening element which is associated with the actuator and which is designed to secure the mass-holding element to the vehicle structure of the vehicle and, in a manner operated by the actuator, to uncouple said mass-holding element from the vehicle structure in the event of an impact or an imminent impact.

Owing to the fastening element, which can be electronically driven for example, the mass-holding element which is located, for example, in the underbody or tunnel of a vehicle, including the object of mass which is fastened to it, is bound to the vehicle structure in an inflexible or flexible manner such that it can be changed over. The object of mass can be uncoupled from the vehicle by means of the fastening element in the event of the vehicle being involved in a collision and in the event of the entire vehicle being decelerated. The mass which is decelerated over this period of time is therefore reduced. Owing to this apparatus, the deceleration which acts on the entire vehicle is influenced such that the effect on, and therefore the risk of injury to, the occupants is considerably reduced in comparison to a vehicle without a system of this kind In this case, the fastening element can be based on mechanical, electrical or magnetic actions of force. The fastening element may be, for example, a powerful solenoid which fixes the object of mass and releases said object of mass when a current is switched off In a further embodiment, the actuator is an electromechanical, pyrotechnic, hydraulic or pneumatic actuator.

When, for example, a pyrotechnic actuator is used, the fastening element is "blown away" similarly to jettisoning of a battery (12 V on-board electrical system battery) in conventionally driven vehicles with an internal combustion engine or an engine hood-raising element for pedestrian protection. Therefore, starting from a specific time, the free movement of the mass-holding element and of the object of mass is allowed at least in one direction relative to the movement direction of the vehicle (for example in the longitudinal direction of the vehicle).

According to a further embodiment, the coupling means have a damping element which is designed to damp a movement of the mass-holding element relative to the vehicle.

Owing to this measure, the object of mass is coupled and uncoupled in a damped manner. Therefore, the recoupling of the object of mass is not a sudden process. Instead, owing to the damping elements, the object of mass is coupled in steps. The damping element used may be, for example, a spring damper system or else an eddy current brake.

In a further embodiment, the damping element is arranged between a front region of the vehicle and the mass-holding element or between a rear region of the vehicle and the mass-holding element.

If the damping element is arranged between the front region of the vehicle and the mass-holding element, the damping element can be fastened either itself to the mass-holding element or else to a holding structure of the vehicle which holds the mass-holding element in the event of an impact involving the vehicle. In the case of the damping element being arranged between the rear region of the vehicle and the mass-holding element, the mass-holding element, including the object of mass, is captured by the rear portion of the vehicle by means of corresponding structures in the event of an impact. This assumes that said structures are of corresponding configuration in respect of the rigidity. By way of example, transverse structures, which serve to absorb the load in the event of a side impact, can be used in the rear region of the vehicle.

According to a further embodiment, the damping element is in the form of an actuator in order to couple the mass-holding element to the vehicle structure with a variable damping factor.

Owing to this measure, the impact momentum can be influenced very effectively. The effects on the occupants of the vehicle are therefore reduced.

In a further embodiment, the damping element is a spring damper element of which the spring force can be adjusted.

In this exemplary embodiment, the spring damper system is designed as a switchable element which allows adaptive adjustment of the spring force. Therefore, a high level of rigidity of the spring damper system can represent the standard case, and a low level of rigidity can represent the vehicle being in an impact situation.

According to a further embodiment, the damping element is in the form of an adaptronic element of which the damping factor is based on electrical or magnetic actions of force.

Said element has to be designed for the standard case (mass-holding element fixed to the vehicle structure) and also for the impact situation (mass-holding element at least partially uncoupled from the vehicle structure). The impact momentum can be precisely influenced by virtue of the adaptronic element.

In a further embodiment, the coupling means have an impact element which is arranged between the front region of the vehicle and the mass-holding element in order to restrict the movements of the at least partially uncoupled mass-holding element.

Travel-controlled coupling and uncoupling, rather than time-controlled coupling and uncoupling, can be realized by virtue of the impact element. Therefore, a prespecified free space for free movement of the mass-holding element or of the object of mass is available in the structure of the vehicle.

In a further embodiment, the impact element is integrally formed with a partial structure of the vehicle, which partial structure is formed in the vehicle as a transverse structure for absorbing a load of a side impact.

The impact element is used as an essential capturing or coupling element for the released object of mass. Since high forces have to be absorbed, said impact element is advantageously a partial structure which is integrated within the vehicle as a transverse load path for covering side collisions. As an alternative, the impact element can be in the form of part of a housing of the object of mass (for example a battery housing) which is carried along and contributes to the overall rigidity of the vehicle.

According to a further embodiment, the mass-coupling arrangement has an associated sensor arrangement which is designed to detect and evaluate sensor data and to pass on results of the evaluation to a controller which controls the actuator.

An existing impact situation or an impact situation which will occur in the future can be precisely determined by virtue of the sensor arrangement such that a drive strategy for the coupling means can be derived as a result. In order to determine the impact characteristic, algorithms can be used, as are customary in the field of airbags for example. The resulting driving of the actuator can be performed by means of a control installation. By way of example, in the event of an impact with a pole, the mass is preferably uncoupled at the beginning of the impact in order to obtain larger deceleration values. During the further course of the impact, the mass-holding element is then coupled again in order to reduce the deceleration. Without this driving, the active accelerations at the beginning of the impact would be very low, but become higher starting from the middle of the impact. The course of acceleration is smooth owing to the driving according to the invention.

In a further embodiment, the sensor arrangement for detecting the sensor data has an acceleration sensor and/or a pressure sensor.

In a motor vehicle, the sensor system may be, for example, a typical airbag sensor system comprising acceleration and pressure sensors which is installed within the vehicle and of which the data is processed by means of the airbag electronics system. However, the electronics system can also be implemented independently of the airbag electronics system.

According to a further embodiment, the sensor arrangement for detecting the sensor data has predictive sensors, in particular laser-based sensors, radar and/or video sensors.

Owing to the predictive sensors, an impact which will occur in the near future can be very precisely determined. This in turn leads to effective influencing of the impact momentum and to an effective reduction in the effect on the occupants.

In a further embodiment, the sensor arrangement for detecting the sensor data has a receiving unit which is designed to receive signals from a communication operation between the vehicle and communication partners in an area surrounding the vehicle.

In particular, signals from a vehicle-to-vehicle communication operation or vehicle-to-infrastructure communication operation can be evaluated by virtue of this measure. This in turn allows early identification of possible impact situations. This allows an optimized drive strategy for the actuator and therefore an effective reduction in the effect on the occupants.

In a particular embodiment, the present invention relates to a motor vehicle drive train comprising an electrical machine for providing drive power, a battery for storing and providing electrical energy for the electrical machine, and comprising a mass-coupling arrangement of the above-described type.

In a further embodiment of the motor vehicle drive train, the mass-coupling arrangement is designed as a battery support arrangement, wherein the battery of the motor vehicle is the object of mass.

It goes without saying that the features mentioned above and those which are still to be explained below can be used not only in the respectively indicated combinations but also in other combinations or on their own, without departing from the scope of the invention.

DETAILED DESCRIPTION

Figure 1:
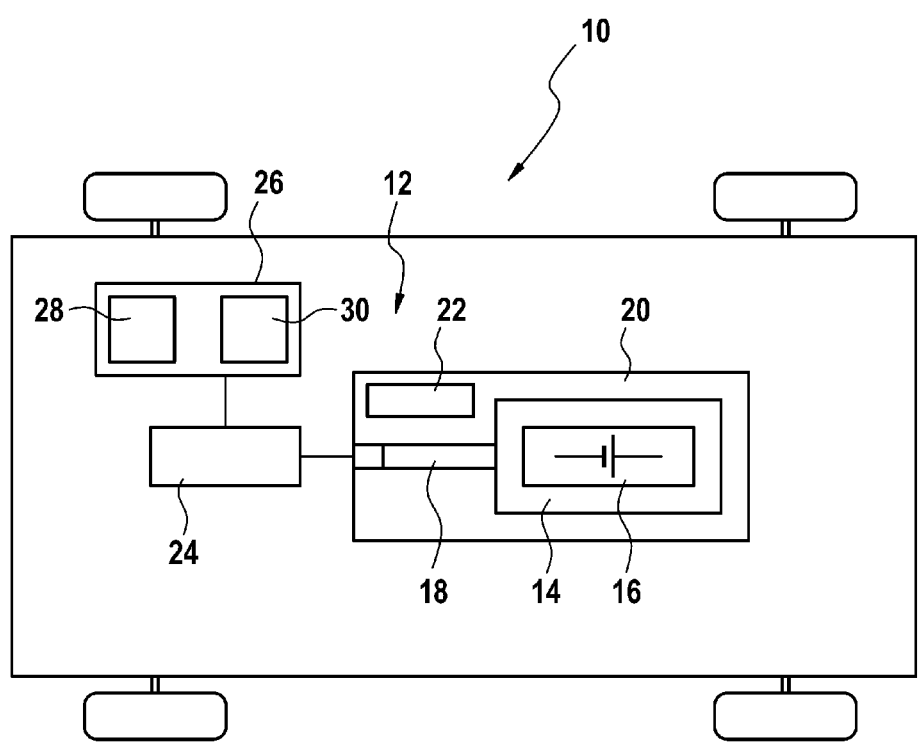
FIG. 1 shows, in schematic form, a motor vehicle comprising a battery support arrangement as an exemplary embodiment of a mass-coupling arrangement.

The mass-coupling arrangement according to the invention will be explained in greater detail below with reference to a motor vehicle 10 which is schematically illustrated in FIG. 1. The selected embodiment of the mass-coupling arrangement is a battery support arrangement 12 which has a battery-holding element 14 which is designed to hold a battery 16 as the object of mass. In this case, the battery 16 is coupled to the battery-holding element 14 in a mechanically fixed manner. It goes without saying that the mass-coupling arrangement according to the invention can also be used in other vehicles, such as electrically driven bicycles for example. Similarly, other singular masses in the vehicle instead of the battery 16 can be defined as the object of mass. By way of example, the described principle of operation can also be applied to a motor as the object of mass.

Furthermore, the battery support arrangement 12 has a guide arrangement 18 by means of which the battery-holding element 14 is mounted such that it can be moved in a longitudinal direction of the motor vehicle 10. In an alternative embodiment, the guide arrangement 18 can also mount the battery-holding element 14 such that it can move in a direction which differs from the longitudinal direction of the motor vehicle 10 or else in various directions.

The battery support arrangement 12 also has coupling means 20. In the normal case, the battery-holding element 14 is firmly coupled to a body of the motor vehicle 10 with the aid of the coupling means 20. In the event of an impact or an imminent impact, the battery-holding element 14 is at least partially uncoupled from the vehicle body at least over a specific time interval by means of the coupling means 20. The coupling means 20 have an actuator 22 which adjusts the degree of coupling and/or the time profile of the coupling.

Furthermore, the coupling means 20 are electrically coupled to a controller 24. The controller 24 serves, in particular, to control the actuator 22. The controller 24 is also electrically connected to a sensor arrangement 26. The sensor arrangement 26 has, in turn, a sensor system 28 and an evaluation electronics system 30. The sensor system 28 typically has an acceleration sensor and/or a pressure sensor. Since said sensors are typically airbag sensors, the data can be evaluated by means of the airbag electronics system. However, the evaluation electronics system 30 can also be realized independently of the airbag electronics system. Furthermore, the sensor system 28 can have predictive sensors. Said sensor system comprises, in particular, laser-based sensors (LIDAR), radar and/or video sensors. The sensor system 28 can also have a receiver unit which receives signals from a vehicle-to-vehicle (Car2Car) or vehicle-to-infrastructure (Car2Infrastructure) communication operation.

An existing impact situation or an impact situation which will occur in the near future can be precisely determined with the aid of the sensor arrangement 26. To this end, the signals which are provided by the various sensors of the sensor system 28 are combined with one another and evaluated in the evaluation electronics system 30. The results of this evaluation are passed on to the controller 24. The controller 24 then drives the actuator 22 by means of which the battery-holding element 14, including the battery 16, is at least partially uncoupled from the body of the motor vehicle 10 and coupled again in the event of an impact or an immediately imminent impact. The time profile of the uncoupling and coupling of the battery-holding element 14 or the degree of coupling depends on the specific impact situation which is determined by the sensor arrangement 26. The actuator-based uncoupling and coupling of the battery-holding element 14 in the event of an impact takes place with the proviso that the effect on the occupants is reduced. The mass which is active during the impact is influenced by the uncoupling and coupling of the battery-holding element 14 according to the invention. This in turn allows the impact momentum to be influenced. Therefore, the deceleration which acts on the entire vehicle 10 can be influenced with the aid of the battery support arrangement 12 such that the effect on, and therefore the risk of injury to, the occupants is considerably reduced in comparison to a vehicle without a system of this kind.

The guide arrangement 18 ensures that the battery-holding element 14, including the battery 16, can be moved exclusively in a longitudinal direction of the motor vehicle 10 during an impact. The distance traveled by the at least one uncoupled battery-holding element 14 in the longitudinal direction of the motor vehicle 10 is restricted by means of the coupling means 20. The coupling means 20 can also dampen the uncoupling and coupling of the battery-holding element 14 in order to smooth the transitions between said two states.

The principles of the law of inertia are applied in the solution according to the invention. The law of inertia $$F=m*a$$

holds true during an impact involving the motor vehicle 10. In the equation, m is the active mass (generally the vehicle mass), F is the force which is applied by a vehicle structure (a vehicle-specific constant), and a is the resulting acceleration. Once the acceleration dissipates, the equation $$a=F/m$$

is produced. It is now assumed that the active mass m of the motor vehicle 10 is made up of two mass elements m1 and m2. In this case, m1 is the mass of the vehicle battery 16 (including the battery-holding element 14 and any other components which are fixedly coupled to the battery 16) which is not fixedly connected to the vehicle body for a certain period of time. Therefore, m2 is the mass of the motor vehicle 10 without the battery 16. Since the force F of the vehicle structure is constant, the acceleration a_new is now $$a\_new=F/m2.$$

Since m2<m, the acceleration is now a_new>a. As a result, this means that the value of the acceleration can be increased by uncoupling a mass from the vehicle body. Conversely, the acceleration can be reduced by subsequently coupling the mass again. Therefore, in summary, the time characteristic of the acceleration can be influenced within certain limits by deliberately coupling and uncoupling masses. This effect is employed in the battery support arrangement 12 according to the invention.

Figure 2:
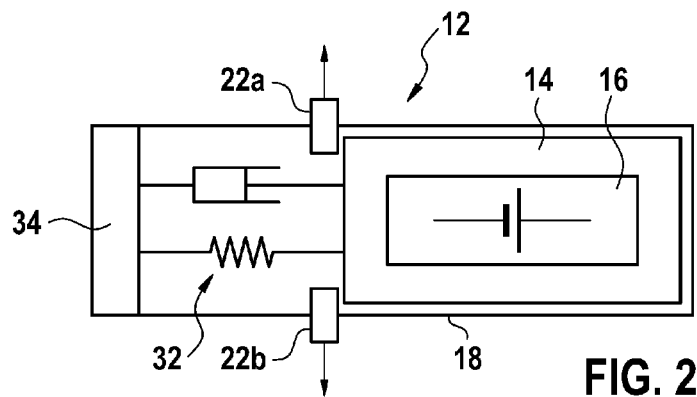
FIG. 2 shows, in schematic form, one embodiment of the battery support arrangement.

FIG. 2 shows, in schematic form, one embodiment of the battery support arrangement 12. The battery support arrangement 12 has the battery-holding element 14, the battery 16 and the guide arrangement 18. The battery support arrangement 12 further has two electromechanical actuators 22a, 22b, a damping element 32 and an impact element 34 which is arranged in the front region of the motor vehicle 10.

If an impact situation is determined by the sensor arrangement 26 (not designated any further in FIG. 2), the electromechanical actuators 22a, 22b are driven by means of the controller 24 in such a way that they are moved laterally in relation to the vehicle longitudinal axis (see arrow direction in FIG. 2). Therefore, the movement of the battery-holding element 14, including the battery 16, is released in the vehicle longitudinal direction. Owing to the forces of mass inertia, the battery-holding element 14, including the battery 16, moves in the direction of the impact element 34 in the event of an impact. In this case, the movement is damped by the damping element 32. The distance traveled by the battery-holding element 14 in the longitudinal direction of the motor vehicle is finally restricted by the impact element 34. The impact element 34 may be a partial structure which is integrated within the motor vehicle 10 as a transverse load path for covering side collisions. In an alternative embodiment, the impact element 34 can also contribute to the total rigidity of the motor vehicle 10 as part of a battery housing which is carried along. In this exemplary embodiment, travel-controlled uncoupling of the battery-holding element 14 is realized with the aid of the electromechanical actuators 22a, 22b and the impact element 34. The characteristic of the uncoupling is therefore determined mainly by the design of the damping element 32 and the distance traveled between the impact element 34 and the battery-holding element 14.

Figure 3:
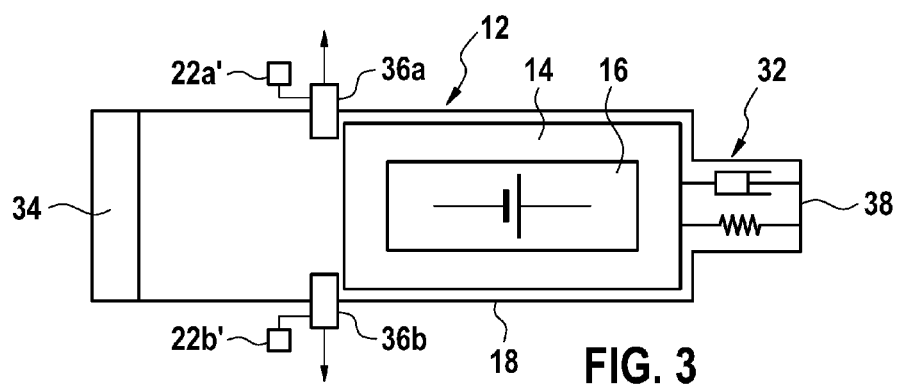
FIG. 3 shows, in schematic form, a further embodiment of the battery support arrangement.

FIG. 3 shows a further embodiment of the battery support arrangement 12. Identical elements to those in FIG. 2 are provided with the same reference symbols and will not be explained in any detail. In this exemplary embodiment, the battery support arrangement 12 has two pyrotechnic actuators 22a' and 22b'. The actuators 22a', 22b' are coupled to fastening elements 36a, 36b which secure the battery-holding element 14 to the body of the motor vehicle 10 in a normal case. In this exemplary embodiment, the impact element 34 is likewise arranged in the front region of the motor vehicle 10. In contrast, the damping element 32 is arranged between a rear region of the motor vehicle 10 and the battery-holding element 14. In the event of an impact involving the motor vehicle 10, the battery-holding element 14, including the battery 16, is therefore captured by a rear part of the motor vehicle 10 by means of the damping element 32. This assumes that capturing structures 38 in the rear part of the motor vehicle 10 have a corresponding rigidity. By way of example, transverse structures which serve to absorb the load in the event of a side impact can be used in the rear region of the motor vehicle 10.

When an impact or an immediately imminent impact is determined by the sensor arrangement 26 (not designated in any detail in FIG. 3), the fastening elements 36a, 36b are blown away with the aid of the pyrotechnic actuators 22a', 22b'. As a result, the movement of the battery-holding element 14, including the battery 16, is released in the longitudinal direction of the motor vehicle 10 starting from this time. The movement of the fastening elements 36a, 36b can also be implemented by means of electromechanical, hydraulic or pneumatic actuators. The only important factor here is that the actuators 22 are designed in such a way that they secure the battery-holding element 14, including the battery 16, to a body of the motor vehicle 10 in the normal case.

In the event of an impact involving the motor vehicle 10, the battery-holding element 14 and the battery 16 are moved in the direction of the impact element 34 by the forces of mass inertia. The impact element 34 restricts the freedom of movement of the battery-holding element 14 in the longitudinal direction of the motor vehicle 10. The movement of the battery-holding element 14 and/or the battery 16 is damped by the damping element 32.

Figure 4:
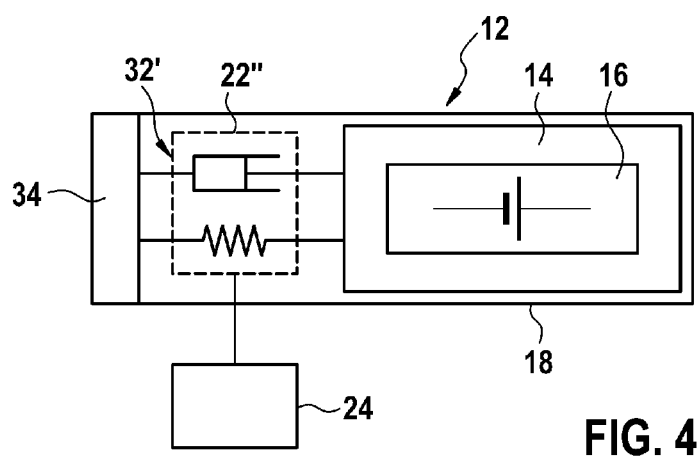
FIG. 4 shows, in schematic form, a further embodiment of the battery support arrangement.

FIG. 4 shows a further embodiment of the battery support arrangement 12. Identical elements to those in FIG. 2 are provided with the same reference symbols and will not be explained in any detail. In this exemplary embodiment, the battery support arrangement 12 has a damping element 32' which couples the battery-holding element 14 to the body of the motor vehicle 10 with a variable damping factor. The damping element 32' is in the form of an actuator 22" or in the form of a spring damper system which allows adaptive adjustment of the spring force. In an alternative embodiment, the damping element 32' can also be in the form of an adaptronic element of which the damping factor is based on electrical or magnetic actions of force. Therefore, the relative movement of the battery 16 in relation to the motor vehicle 10 can also be influenced, for example, by a (for example linearly acting) eddy current brake. Fastening elements 36 can additionally be used when an eddy current brake is used.

In the case of the actuator 22" which is shown in FIG. 4, the spring damper system is actuated by the controller 24 in the standard case in such a way that a high level of rigidity is set in the spring damper system. Therefore, the battery-holding element 14 and the battery 16 are coupled to the body of the motor vehicle 10 in a substantially inflexible manner in the standard case.

When an impact or an immediately imminent impact is determined by the sensor arrangement 26 (not designated in any detail in FIG. 4), the level of rigidity of the actuator 22" is initially lowered and then raised again in line with a prespecified profile which can be determined by the evaluation electronics system 30 or else the controller 24. As an alternative, the level of rigidity of the actuator 22" can also only be lowered. In this case, all of the kinetic energy of the battery-holding element 14 and of the battery 16 is absorbed by the impact element 34.

What is claimed is:

1. A mass-coupling arrangement (12) for a vehicle (10), comprising:
a mass-holding element (14) for holding an object of mass (16),
a guide arrangement (18) coupled to the mass holding element (14) such that the mass holding element (14) can move relative to the vehicle (10), and
a coupling means (20) configured to couple the mass-holding element (14) to a vehicle structure which is fixedly connected to the vehicle (10), and to at least partially uncouple said mass-holding element from the vehicle structure, wherein the coupling means (20) have an actuator (22, 22') configured to adjust the coupling, and a controller (24) coupled to the actuator (22) to control the actuator (22, 22'), wherein when the mass-holding element (14) is uncoupled, the mass-holding element (14) is free to move relative to the vehicle based solely on forces of mass inertia, without having been acted upon by an acceleration device on the vehicle.

2. The mass-coupling arrangement as claimed in claim 1, wherein the coupling means (20) have a fastening element (36) which is associated with the actuator (22) and which is configured to secure the mass-holding element (14) to the vehicle structure of the vehicle (10) and, in a manner operated by the actuator (22), to uncouple said mass-holding element from the vehicle structure in the event of an impact or an imminent impact.

3. The mass-coupling arrangement as claimed in claim 1, wherein the actuator (22) is an electromechanical, pyrotechnic, hydraulic or pneumatic actuator.

4. The mass-coupling arrangement as claimed in claim 1, wherein the coupling means (20) have a damping element (32) which is configured to damp a movement of the mass-holding element (14) relative to the vehicle (10).

5. The mass-coupling arrangement as claimed in claim 4, wherein the damping element (32) is arranged between a front region of the vehicle (10) and the mass-holding element (14) or between a rear region of the vehicle (10) and the mass-holding element (14).

6. The mass-coupling arrangement as claimed in claim 4, wherein the damping element (32) forms part of the actuator, and is coupled to the controller (24) in order to couple the mass-holding element (14) to the vehicle structure with a variable damping factor.

7. The mass-coupling arrangement as claimed in claim 6, wherein the damping element (32) is a spring damper element of which a spring force can be adjusted.

8. The mass-coupling arrangement as claimed in claim 6, wherein the damping element (32) is in the form of an adaptronic element of which the damping factor is based on electrical or magnetic actions of force.

9. The mass-coupling arrangement as claimed in claim 1, wherein the coupling means (20) have an impact element (34) which is arranged between a front region of the vehicle (10) and the mass-holding element (14) in order to restrict movement of the at least partially uncoupled mass-holding element (14).

10. The mass-coupling arrangement as claimed in claim 1, wherein the mass-coupling arrangement has an associated sensor arrangement (26) which is configured to detect and evaluate sensor data and to pass on results of the evaluation to the controller (24).

11. The mass-coupling arrangement as claimed in claim 10, wherein the sensor arrangement (26) for detecting the sensor data has an acceleration sensor and/or a pressure sensor.

12. The mass-coupling arrangement as claimed in claim 10, wherein the sensor arrangement (26) for detecting the sensor data has predictive sensors.

13. The mass-coupling arrangement as claimed in claim 10, wherein the sensor arrangement (26) for detecting the sensor data has a receiving unit which is configured to receive signals from a communication operation between the vehicle (10) and communication partners in an area surrounding the vehicle (10).

14. The mass-coupling arrangement as claimed in claim 10, wherein the sensor arrangement (26) for detecting the sensor data has laser-based sensors, radar sensors and/or videos sensors.

15. The mass-coupling arrangement as claimed in claim 10, wherein the mass-holding element (14) is configured to be uncoupled during a vehicle impact, based on evaluation of the sensor data.

16. The mass-coupling arrangement as claimed in claim 10, wherein the mass-holding element (14) is configured to be uncoupled in anticipation of a vehicle impact, based on evaluation of the sensor data.

17. The mass-coupling arrangement as claimed in claim 1, wherein the mass-holding element (14) is mounted by means of the guide arrangement (18) such that the mass-holding element can move in a longitudinal direction of the vehicle (10).

18. The mass-coupling arrangement as claimed in claim 1, wherein the object of mass (16) is a battery (16) which is configured to provide electrical energy for driving the vehicle (10).

19. The mass-coupling arrangement as claimed in claim 1, wherein the controller (24) is configured to actuate the actuator (22) in the event of an impact or an imminent impact.

20. The mass-coupling arrangement as claimed in claim 1, wherein the actuator is configured to adjust a degree of coupling and/or a time profile of the coupling.

21. The mass-coupling arrangement as claimed in claim 1, wherein when the mass-holding element (14) is uncoupled, the mass-holding element (14) is free to move along a longitudinal direction of the vehicle.

22. The mass-coupling arrangement as claimed in claim 1, wherein when the mass-holding element (14) is uncoupled, the mass-holding element (14) is configured to move toward a front of the vehicle.

\* \* \* \* \*